United States Patent

[11] 3,546,397

[72] Inventors Graham S. Laing; Harry M. Coumans, London, Ontario, Canada
[21] Appl. No. 716,713
[22] Filed March 28, 1968
[45] Patented Dec. 8, 1970
[73] Assignee Northern Electric Company Limited Montreal, Quebec, Canada

[54] SHOCK DISSIPATING TELEPHONE INSTRUMENT
7 Claims, 9 Drawing Figs.

[52] U.S. Cl. .......... 179/100, 179/146
[51] Int. Cl. .......... H04m 1/06
[50] Field of Search .......... 179/100, 100(C), 100(D), 103, 146, 179

[56] References Cited

UNITED STATES PATENTS

| | | | |
|---|---|---|---|
| 2,639,334 | 5/1953 | Fleming | 179/146 |
| 2,949,509 | 8/1960 | Whidden | 179/100(C)UX |
| 3,073,911 | 1/1963 | Mattile et al | 179/179 |
| 3,384,718 | 5/1968 | Wilder | 179/100(D) |

FOREIGN PATENTS

| | | | |
|---|---|---|---|
| 1,134,715 | 8/1962 | Germany | 179/100(C) |

*Primary Examiner*—Kathleen H. Claffy
*Assistant Examiner*—Randall P. Myers
*Attorneys*—Peter Kirby and George A. Seaby

ABSTRACT: A socket of the telephone instrument comprises a first end surface for retaining the receiver end portion and a second end surface for retaining the transmitter end portion of the handset. The receiver end portion has at its lower end a convex lip edge which engages an upwardly and outwardly inclined shelf surface provided at the lower end of the first end socket surface when the instrument is used in its vertical orientation as a wall instrument. To prevent any shocks onto the wall on which the instrument is installed from being directly transmitted to the handset and causing the handset to fall off the socket, an inwardly and upwardly curved surface is provided to form a smooth inward continuation of the shelf surface, the curvature of such continuation surface being more gradual than the curvature of the convex lip edge, so that upon occurrence of an impact on the socket, the lip edge is first caused to climb up the continuation surface so that only part of the shock energy is transmitted as kinetic energy in the horizontal direction.

SHOCK DISSIPATING TELEPHONE INSTRUMENT

This invention relates to improvements in the housing structure of a telephone instrument, that is to say to the structure itself and the particular arrangement and location of the surfaces and parts thereof that enable the instrument to perform certain useful functions and to be used in certain advantageous ways, without specific regard to the details of the electrical equipment that the structure will be called upon to house, such electrical equipment being assumed to be conventional or, in any case, not to be germane to the present inventive advances.

The invention is concerned with the housing structure ructure of a telephone apparatus that is adapted for mounting in a vertical orientation as a wall instrument. In the preferred form of the invention, the instrument is adapted for universal mounting, that is to say for mounting, without modification, either vertically oriented as a wall instrument or horizontally oriented as a table instrument. However, in its broad scope, the invention is applicable to telephone apparatus that is designed specifically for wall use, as well as to apparatus that is capable of universal use.

More specifically, the invention is directed to a telephone housing structure of the type comprising an elongated handset, an upper portion of the front face of which is provided with a projecting lip surface portion that is constructed to cooperate with a complementary shelf surface portion formed on a base that is designed to be secured to a wall. The lip and shelf surface portions slope downwardly and inwardly relatively to the base, so as to support the handset securely (but nevertheless removably) in a vertical orientation on the base.

An instrument of this type has been described in J. F. Tyson Canadian Pat. No. 815,122 issued June 10, 1969 (application Ser. No. 627,372 filed Mar. 31, 1967), and the present invention is especially well adapted for incorporation into this prior instrument. Indeed the invention has been illustrated below as incorporated in an instrument of this type, although, as already explained, in its broad application the invention is applicable to wall mounted telephones generally.

A difficulty that can arise in wall mounted telephones is the dislodging effect of shock transmitted to the instrument through the wall. Such a shock might be produced, for example, by the slamming of a door mounted in the wall near the instrument. In telephone instruments in which the handset is held in place solely by the cooperation of lip and shelf surface portions of the type described above, it is necessary to ensure that such a shock will not dislodge the lip surface portion from the shelf surface portion to allow the handset to fall. On the other hand, it is desirable to minimize impedance to the intentional removal of the handset from the base by the user. For the latter reason it is preferred in such instruments to form the shelf and lip surface portions no deeper and no more steeply inclined to the horizontal than is strictly necessary to ensure reliable retention of the handset under normal conditions. However, allowance must also be made for the dislodging effect of severe shocks that could otherwise jar the handset off the base.

It is believed that the mechanism of such a dislodgement is at least partly one of rebound. The handset is normally seated snugly against the base with its front face (or at least those parts of its front face immediately above the lip surface portion, e.g. the receiver portion) engaging a face of the base. It is thought that, more often than not, when a shock is received it is transmitted between these contiguous faces, the effect being a force tending to push the handset horizontally away from the base, notwithstanding the fact that this movement requires the handset to climb up the incline of the shelf surface portion.

In the past, the solution to this problem has had to be either to make the shelf surface portion comparatively steep, which is not convenient for the user, more especially when the same base is to be used as part of a table instrument, or to make the shelf surface portion comparatively deep, i.e. to increase its inward horizontal dimension to increase the distance that the handset must travel before it can be dislodged. In practice some combination of these two expedients is usually employed. The latter expedient is no more desirable than the first, either from the viewpoint of the user, or from that of the designer, since it tends to increase the overall thickness dimension and hence the weight of the handset.

The present invention provides a way of harmlessly dissipating the energy of such shocks, at least to an extent sufficient to avoid any need to deepen or steepen the lip and shelf surface portions beyond the dimensions typically found otherwise convenient by the designer. Moreover, the invention achieves this end without finding it necessary to employ special energy absorbent materials, such as rubber pads or the like, which devices would tend to be unsightly and of uncertain durability, while also representing a manufacturing complication.

The primary object of the invention is thus to achieve the desired energy dissipation effect without the addition of such special materials, but instead solely by a particular shaping of the cooperating base and handset surface portions. This object is achieved by providing on the base a further surface portion that extends inwardly and upwardly of the base to form an inward continuation of the shelf surface portion. While not essential to the invention in its broadest concept, it is preferable to form this further surface portion as a curved surface that forms a smooth continuation of the shelf surface portion. The curvature of this further (continuation) surface portion is made more gradual than that of the opposed edge of the lip surface portion, which edge may be significantly curved, or may, at least theoretically, be a sharp edge, although, these parts being required for manual use, some curvature will virtually always be provided in practice.

This differential curvature, that is the shelf continuation surface portion being the more gradual (i.e. of greater radius of curvature when a circular arc is used, which is by no means essential) combined with other structural features of the base and handset, has the effect of providing a space between the front face of the handset and the more inwardly and upwardly located portions of the continuation surface portion, into which space the front face of the handset can move, upon upward movement of the lip edge along the continuation surface portion in response to a shock.

Further features of the present invention will appear from the following specific description which is provided by way of example only.

Figures 1, 2, 3, 4:
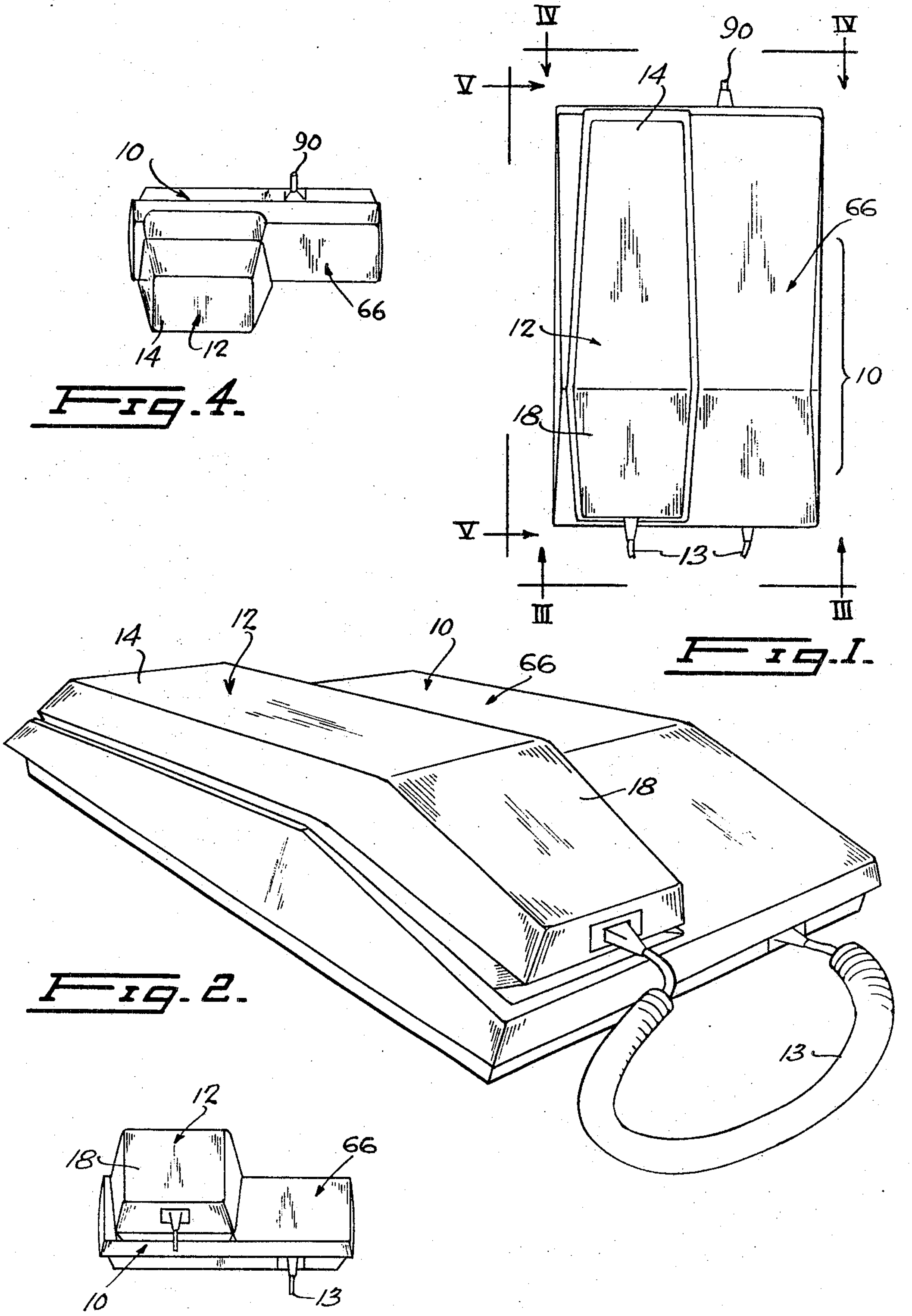
FIG. 1 is front view of an apparatus constituting a telephone instrument housing structure shown in its vertical orientation.
FIG. 2 is a perspective view of the apparatus of FIG. 1, shown in its horizontal orientation.
FIG. 3 is a bottom elevation taken on the line III–III in FIG. 1.
FIG. 4 is top elevation taken on the line IV–IV in FIG. 1.

Referring to FIGS. 1 to 6, the apparatus comprises a base 10 defining a socket 11 shaped to receive and removably retain an elongated handset 12, a conventional flexible cord 13 connecting the handset 12 to the base 10 and a cable 90 being provided for connecting the apparatus to the telephone network in the usual way.

The handset 12 comprises a first end portion 14 for housing a conventional receiver 15 (FIGS. 7 and 8), a central portion 16 for housing a rotary dialing mechanism 17 and a second end portion 18 for housing a conventional transmitter (not shown). Instead of the rotary dialing mechanism 17, a push-button type dialing mechanism can be used. The handset 12 further includes a rectangular depression 60 disposed in the central portion 16 and designed to receive a number plate or other desired indicia, and a recall switch 61 which is a known device that is electrically connected to serve the same function as the switch hook 56 described below.

The socket 11 for the handset 12 is formed asymmetrically in the base 10, in that the latter extends laterally from the socket 11 substantially only to one side of the handset 12 to provide an extended casing portion 66 for housing a ringer and other conventional electrical equipment (not shown). The socket 11 consists principally of first and second end socket surface portions 40 and 41 for receiving respectively the first and second end portions 14 and 18 of the handset 12, and a central socket surface 48. The end surface portions 40 and 41 extend outwardly into inclined end faces 46 and 47, respectively. An inwardly and downwardly inclined shelf surface portion 50 is formed between the first end surface portion 40 and the central surface portion 48 of the socket 11, and a similar shelf surface portion 52 is formed between the central surface portion 48 and the second end surface portion 41. The switch hook 56 is mounted in the base 10 to project through an elongated slot 91 provided in the first end socket surface portion 40.

Figure 7:
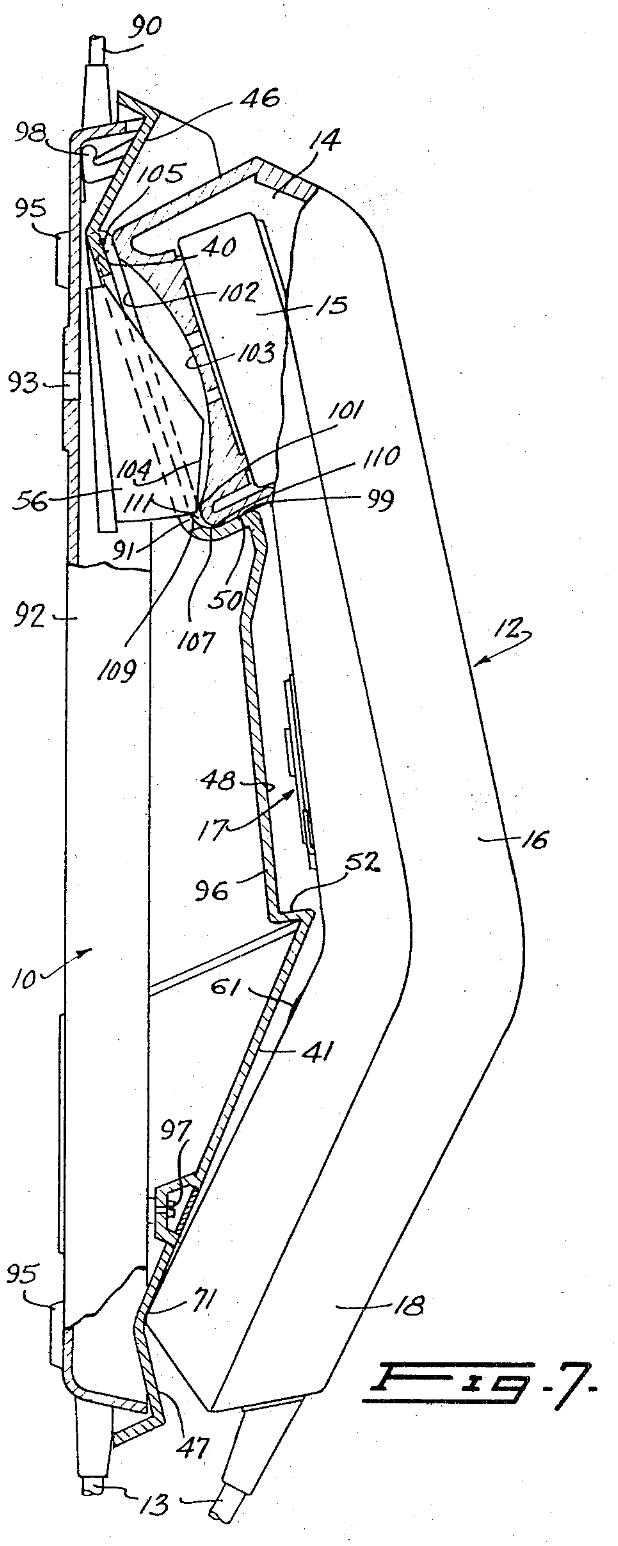
FIG. 7 is a larger scale, partly cut away, side view of the apparatus shown in its vertical orientation.
Figure 5:
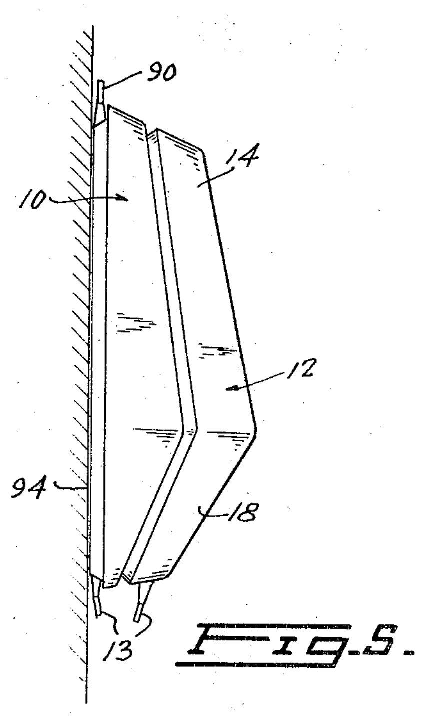
FIG. 5 is a side elevation taken on the line V–V in FIG. 1.
Figure 6:
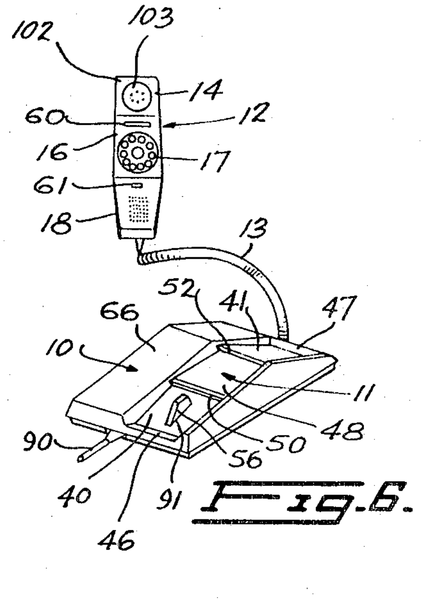
FIG. 6 is a rear perspective view of the apparatus in its horizontal orientation with the handset raised.
Figures 8, 9:
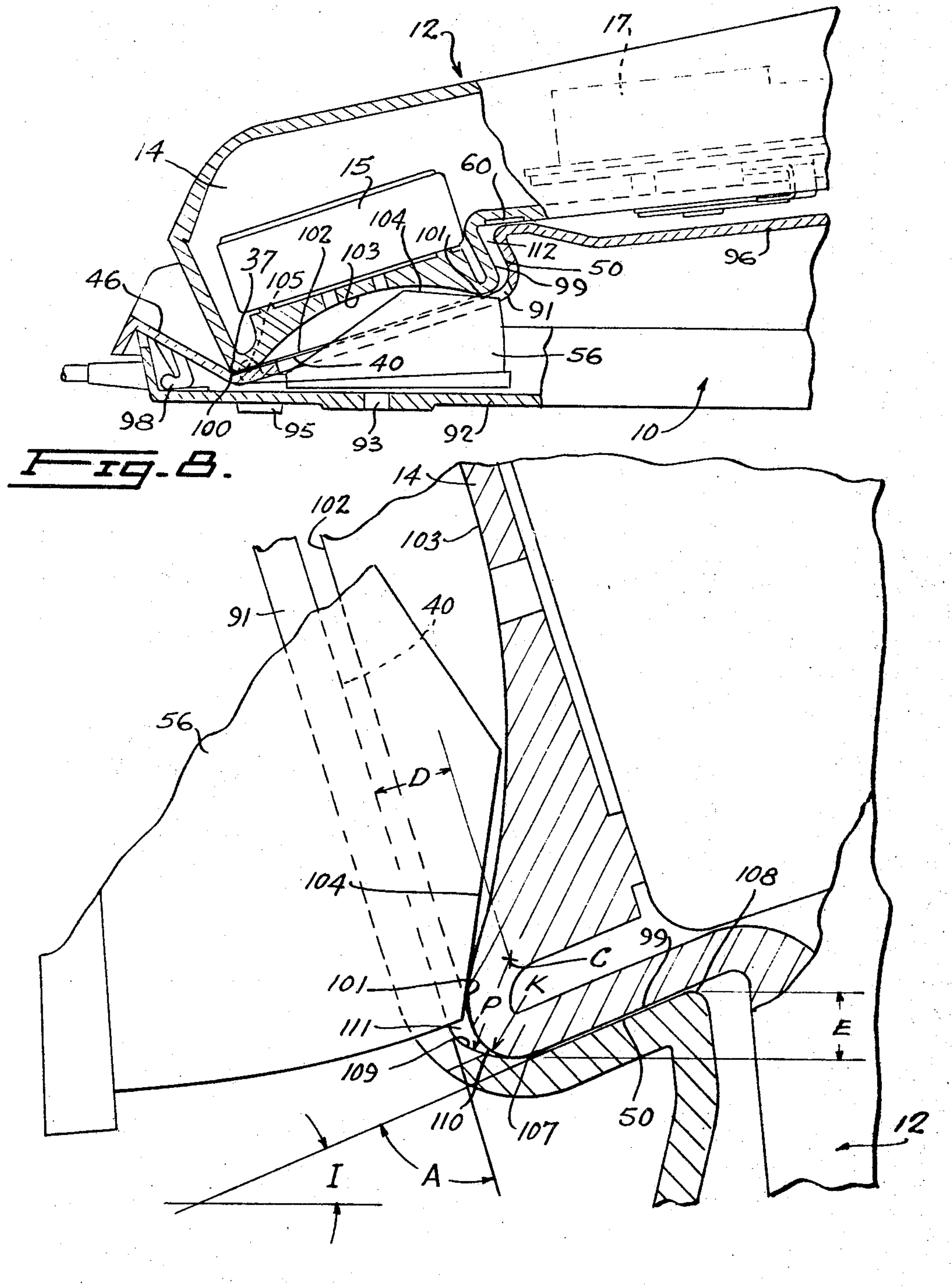
FIG. 8 shows part of the base of the housing structure and of the handset in a partly cut view similar to that of FIG. 7 but in the horizontal orientation of the apparatus.
FIG. 9 shows a detail of FIG. 7 on a still further enlarged scale.

As shown in FIGS. 7 and 8, the base 10 comprises a base plate 92 having holes 93 for mounting the apparatus in its vertical orientation on a wall 94 (FIG. 5), and projecting rubber feet 95. The base 10 also includes a casing 96 mounted on the base plate 92 by screws such as 97 and resiliently engaging fittings, as shown at 98.

The socket 11 and the handset 12 are so shaped that the handset 12 is received in the socket 11 in an only very slightly different relative position depending upon whether the instrument is used as a wall apparatus as shown in FIG. 7 or as a table apparatus as shown in FIG. 8. In the vertical orientation of FIG. 7, the handset is supported by a lip surface portion 99 of the first end portion 14 of the handset 12, which lip surface portion complements and engages the inclined shelf surface portion 50 while extending approximately to the lowermost point 107 thereof. In this position the center of gravity of the handset 12 lies to the right of the lip surface portion 99 causing a heel portion 71 of the second end portion 18 of the handset 12 to bear against the lower end socket surface portion 41 so that the handset seats firmly in the socket 11.

In the horizontal orientation of FIG. 8, a front edge 37 of the first end portion 14 of the handset 12 engages a groove 100 formed between the first end socket surface portion 40 and the adjacent end face 46, while the heel 71 contacts the second end socket surface portion 41 in substantially the same way as shown in FIG. 7.

In both the vertical as well as the horizontal positions, a ridge 101 formed between a substantially plane front surface portion 102 of the end portion 14 of the handset 12 and a shallow, part-spherical cavity 103 provided in the center of the front surface portion 102 engages a shoulder 104 of the switch hook 56 thereby rotating the switch hook 56 about a fulcrum 105 against the action of a spring (not shown). The electrical contacts of the switch hook 56 are not shown, but it will be understood that these are actuated to the "hung up" position under the condition of inward travel of the switch hook 56 of either FIG. 7 or 8, these conditions being slightly different from each other because of the fact that the front surface portion 102 of the handset 12 rests on the socket surface portion 40 in the horizontal orientation of FIG. 8 but not in the vertical orientation of FIG. 7. To be allowed to move to its "on line" condition the switch hook 56 must be fully released, as in FIG. 6.

Assuming the instrument to be in its vertical orientation (FIGS. 7 and 9), the occurrence of a shock tending to produce horizontal movement of the handset relative to the base causes the first end portion 14 of the handset to travel inwardly and upwardly towards the end socket surface portion 40, whereby much of the kinetic energy of the impact is temporarily converted to potential energy and eventually dissipated as heat. More specifically, there is provided an inwardly and upwardly curving surface portion 109 as a smooth inward continuation of the shelf surface portion 50. The edge 110 of the lip surface portion 99 of the handset 12 can climb up this continuation surface portion 109 while moving into the space 111 that normally exists in the vertical orientation of the apparatus between the edge 110 and the surface portion 40. This relative vertical movement will raise the center of gravity of the handset converting the kinetic energy of the shock partly into friction and partly into potential energy. The handset will of course quickly return, to regain its position of lowest potential energy shown in FIG. 9, during which movement more of the shock energy is converted into friction. As a result, the kinetic energy of the shock is imparted to the handset 12 only partly and only gradually, and the risk of the handset rebounding sufficiently to fall off the shelf surface portion 50 is reduced.

As best appreciated from FIG. 9, in the preferred form of apparatus the first end socket surface portion 40, the shelf surface portion 50 and the lip surface portion 99 have the following dimensions:

a. the inclination I of the upper planar shelf surface portion 50 relative to the horizontal is about 24°;
b. the angle A between the surface portion 50 and the end socket surface portion 40 is about 85°;
c. the vertical distance E between the lowermost point 107 and the uppermost point 108 of the shelf surface portion 50 is about five thirty-seconds of an inch;
d. the radius P of the continuation surface portion 109 between the shelf surface portion 50 and the socket surface portion 40 is about three-sixteenths of an inch, subject to the more detailed explanation below;
e. the distance D of the center C of the surface portion 109 from the socket surface portion 40 is about five thirty-seconds of an inch;
f. the radius K of the edge 110 is about one-sixteenth of an inch; and
g. the angle between surface portions 102 and 99 will normally be equal to A. Obviously it could not be larger, or the surface portions 40 and 102 would come together at a location above the surface portion 109.

As can be seen from a comparison of the values given for the radius P and the distance D, the continuation (or "transitional" surface portion 109 does not have a uniform curvature between the shelf surface portion 50 and the socket surface portion 40. Instead, the radius of the surface portion 109 is gradually reduced towards its transition into the surface portion 40. It should also be noted that it is not necessary to employ circular arcs. Even a straight line ramp can be used, although a steady curvature that serves smoothly and gradually to accelerate the edge 110 in an upward direction when the socket 11 is subjected to shock is the most effective, the essential consideration being that the curvature of the surface portion 109, varying though it may be, must always remain more gradual than that of the edge 110 in order to ensure that the space 111 exists, at least in this orientation of the instrument. Of course in the horizontal orientation (FIG. 8) the space 111 disappears in favour of a space 112 between the surface portions 50 and 99.

The above dimensions have been found to be optimum values by stability tests in which a model of the telephone apparatus was mounted on a wall and impacts of increasing strength were imparted to the wall, such impacts being similar to those commonly experienced in a regularly installed telephone apparatus as a result of vibrations or shocks transmitted from a suddenly closed door.

It will be appreciated that these optimum values are related to a specific embodiment of the telephone apparatus and depend on a variety of factors, such as the overall shape of the handset 12 and the socket 11, the elasticity and smoothness of the materials used at the contacting surfaces, and the total weight and the position of the center of gravity of the handset 12, such factors largely being determined in practice by considerations of technology, manufacture and practicability.

We claim:

1. The housing structure of a telephone apparatus suitable for mounting in a vertical orientation as a wall instrument, comprising:

a. an elongated handset having a front face with a lip surface portion projecting to an edge from an upper portion of said handset;

b. and a base having a shelf surface portion for receiving said lip surface portion, said surface portions sloping downwardly and inwardly of the base when the latter is mounted vertically for removably but securely supporting said handset in vertical orientation; and c. said base having an inwardly and upwardly extending further surface portion forming an inwardly and upwardly curved continuation of said shelf surface portion, the curvature of said further surface portion being more gradual than that of the opposed edge of the lip surface portion whereby said edge can travel inwardly and upwardly along said further surface portion when the structure is subject to a shock.

2. The structure of claim 1, including: switch hook means mounted in said base and having a member projecting from the base to present an outer surface portion to the handset for actuation thereby, said outer surface portion sloping downwardly to render unimpeded the support of the lip surface portion of the handset by said shelf surface portion of the base.

3. The housing structure of a telephone apparatus suitable for mounting in a vertical orientation as a wall instrument, comprising:

a. an elongated handset having a front face with a lip surface portion projecting to an edge from an upper portion of said handset;

b. a base having a shelf surface portion for receiving said lip surface portion, said surface portions sloping downwardly and inwardly of the base when the latter is mounted vertically for removably but securely supporting said handset in vertical orientation;

c. said base having a curved, inwardly and upwardly extending, further surface portion forming a smooth inward continuation of said shelf surface portion, the curvature of said further surface portion being more gradual than that of the opposed edge of the lip surface portion; and d. surface means on the base and handset forming a space between the front face of the handset and the more inwardly and upwardly located parts of said further surface portion, into which space said front face can move upon upward movement of said edge along said further surface portion in response to a shock.

4. The structure of claim 3, for mounting without modification in a horizontal orientation as a table instrument, wherein said surface means (d) comprise base and handset surface portions positioned for cooperation with each other in such horizontal orientation to support the handset on the base at a position substantially the same as that temporarily occupied by the handset upon said upward movement of said edge of the lip surface portion along said further surface portion.

5. The structure of claim 4, including switch hook means mounted in said base and having a member projecting from the base for actuation by the handset in both its position on the base in said vertical orientation and its position on the base in said horizontal orientation, said member presenting an outer surface portion to the handset for said actuation thereby, said outer surface portion sloping downwardly to render unimpeded the support of the lip surface portion of the handset by said shelf surface portion of the base.

6. The structure of claim 3, wherein:

a. said surface means (d) includes an upper end surface portion forming an upper continuation of said further surface portion and being inclined to said shelf surface portion at an angle of approximately 85°;

b. said shelf surface portion is inclined to the horizontal at approximately 24°, when the structure is in the vertical orientation;

c. the vertical dimension of said shelf surface portion when the structure is in the vertical orientation is approximately five thirty-seconds of an inch;

d. the edge of said lip surface portion has a radius of approximately one-sixteenth of an inch; and e. said further surface portion is circularly curved with a radius of approximately three-sixteenths of an inch.

7. In a housing structure of a telephone instrument suitable for mounting without modification in a horizontal or in a vertical orientation:

a. an elongated handset comprising a first and a second end portion, said first end portion having a projecting lip surface portion facing substantially towards said second end portion and terminating in a convex edge; and b. a base defining a socket for removably retaining said handset, said socket comprising:

i. a first end surface portion extending substantially vertically in the vertical orientation of the instrument for receiving said first end portion;

ii. a shelf surface portion facing upwardly and being inwardly and downwardly inclined in the vertical orientation of the instrument for engaging and supporting said lip surface portion;

iii. a second end surface portion for contacting said second end portion; and iv. a transitional surface portion between said first end surface portion and said shelf surface portion, said transitional surface portion being formed as a steadily curved concave surface portion having a curvature more gradual than that of said convex edge for a horizontal shock force acting against said socket to cause an upward movement of the handset in the socket with said edge moving up the transitional surface portion.